(12) United States Patent
Soupizon et al.

(10) Patent No.: US 7,351,030 B2
(45) Date of Patent: Apr. 1, 2008

(54) CONNECTION DEVICE FOR MAKING A CONNECTION BETWEEN A TURBOMACHINE NOZZLE AND A FEED ENCLOSURE FOR FEEDING COOLING FLUID TO INJECTORS

(75) Inventors: Jean-Luc Soupizon, Vaux le Penil (FR); Sebastien Imbourg, Yerres (FR); Philippe Jean Pierre Pabion, Vaux le Penil (FR)

(73) Assignee: Snecma Moteurs, Paris (FR)

( * ) Notice: Subject to any disclaimer, the term of this patent is extended or adjusted under 35 U.S.C. 154(b) by 332 days.

(21) Appl. No.: 10/986,894

(22) Filed: Nov. 15, 2004

(65) Prior Publication Data
US 2005/0167531 A1 Aug. 4, 2005

(30) Foreign Application Priority Data
Nov. 17, 2003 (FR) .................................. 03 13390

(51) Int. Cl.
*F03B 11/00* (2006.01)
(52) U.S. Cl. ...................................... 415/115; 415/116
(58) Field of Classification Search ............. 285/145.1, 285/224, 145.4, 136.1, 237, 234; 415/115, 415/160, 116
See application file for complete search history.

(56) References Cited

U.S. PATENT DOCUMENTS 2,836,393 A * 5/1958 Freeman et al. ............. 415/178
4,379,677 A * 4/1983 Hallinger et al. ........... 415/175
4,522,557 A * 6/1985 Bouiller et al. ............. 415/115
5,224,818 A * 7/1993 Drerup et al. .............. 415/115
5,795,128 A * 8/1998 Eichstadt .................... 415/160
5,984,637 A * 11/1999 Matsuo ...................... 716/97 R
5,993,150 A * 11/1999 Liotta et al. ................ 415/115
6,443,694 B1* 9/2002 Karlsson .................... 415/115

FOREIGN PATENT DOCUMENTS

| EP | 0 860 587 A2 | 8/1998 |
| EP | 0 890 710 A3 | 1/1999 |
| EP | 1 164 250 A2 | 12/2001 |
| EP | 1 209 324 A2 | 5/2005 |

* cited by examiner

*Primary Examiner*—David Bochna
(74) *Attorney, Agent, or Firm*—Oblon, Spivak, McClelland, Maier & Neustadt, P.C.

(57) ABSTRACT

A connection device between a nozzle and a feed enclosure for feeding cooling fluid to at least one injector in a turbomachine, the device comprises at least one bushing having open axial ends engaged in orifices in a wall of the nozzle and in a wall of the feed enclosure, together with retaining means for retaining the bushing axially, the retaining means being formed to project from an outer cylindrical surface of the bushing between the axial ends of the bushing and at a distance from said ends.

20 Claims, 5 Drawing Sheets

CONNECTION DEVICE FOR MAKING A CONNECTION BETWEEN A TURBOMACHINE NOZZLE AND A FEED ENCLOSURE FOR FEEDING COOLING FLUID TO INJECTORS

The present invention relates to a connection device between a nozzle and a feed enclosure for feeding fluid to at least one injector of cooling fluid into a turbomachine, such as a turbojet or a turboprop for an airplane.

BACKGROUND OF THE INVENTION

In turbomachines, the injectors can be disposed radially on the inside and on the outside of the nozzles, and injector feed enclosures with connection devices for making connections with the nozzles can also be disposed radially on the inside and on the outside of the nozzles.

Known connection devices are constituted by cylindrical bushings having their ends engaged in orifices in the wall of the nozzle and in the feed enclosures, and which are capable of sliding in said orifices. Axial retaining means are provided to prevent the bushings from escaping from the orifices and they are formed firstly by flaring one end of each bushing and by providing an intermediate flange mounted in the under-nozzle feed enclosure for the bushings mounted in the internal chambers, and secondly by using retaining rings which, for retention purposes, require an annular groove to be machined inside an intermediate bushing housed in the wall of the over-nozzle feed enclosure, and in which a portion of the connection device is engaged, for the bushings mounted in the external chambers.

Those devices of multiple shapes increase the risk of error when it comes to selecting the appropriate connection device for mounting on the turbomachine, and prevent the cost of manufacturing such devices being optimized. In addition, each additional part of a different shape constitutes a new reference that must be managed, e.g. in terms of duration such as manufacturing duration or transport duration; in terms of availability, e.g. whether parts are available in stock for making or maintaining turbomachines; or indeed in terms of quality, which needs to be monitored in order to comply with the strict specifications that are needed in the field of aviation. Managing each new part is expensive.

In addition, the weight and cost constraints to which turbomachines must comply require manufacturers to make connection devices and means for preventing such devices moving axially that are simultaneously simple, lightweight, and inexpensive. The known technique for satisfying the above-mentioned constraints consists in achieving axial retention of the connection device towards the rotor of the turbomachine by means of an intermediate plate disposed inside the under-nozzle feed chamber, which plate also serves to maintain sealing of the feed enclosure. The intermediate plate is shaped to present a bearing surface that is to come into contact with the axial end of the connection device that is adjacent to the rotor of the turbomachine.

Although that technique for preventing movement is very simple, it suffers from the drawback of reducing the cross-section of the feed enclosure where the connection device opens out to the inside of the feed enclosure. That reduction leads to significant head losses on the flow of gas leaving the connection device. Such head losses reduce the feed pressure to the injectors, and consequently the quality of the injection, since it needs to be performed under high pressure.

In addition, using an intermediate plate to form an axial abutment increases the weight of the feed enclosure, and consequently increases the mass/power ratio of the turbomachine, whereas attempts are always made to reduce said ratio.

OBJECTS AND SUMMARY OF THE INVENTION

An object of the invention is to avoid the above-mentioned drawbacks and to provide a solution that is technically simple and inexpensive to the problems of axially retaining connection devices between nozzles and injector feed enclosures, while also reducing head losses inside under-nozzle feed enclosures.

To this end, the invention provides a connection device between a nozzle and a feed enclosure for feeding at least one cooling fluid injector in a turbomachine, the device comprising at least one bushing slidably mounted via its open axial ends in orifices in a wall of the nozzle and in a wall of the feed enclosure, and also retaining means for retaining the bushing axially, wherein said retaining means comprise abutment means projecting from a cylindrical outer surface of the bushing between the axial ends of the bushing and at a distance from said ends.

The term "axial retention of the bushing" should be understood as meaning retaining the bushing in a direction that is parallel to its axis of symmetry.

In a preferred embodiment, said abutment means comprise an outer annular collar projecting from the cylindrical surface of the bushing.

An advantageous characteristic of the bushing of the invention is that it can be made integrally as a single piece by mechanical deformation or by machining, e.g. by hydro-forming or by stamping.

In another embodiment of the invention, the bushing is formed by a tubular element having an annular washer fitted and secured thereto to form the above-mentioned collar.

In a variant embodiment of the invention, the bushing is constituted by two elements, each having an annular rim at one end, the two annular rims being pressed one against the other and being united, e.g. by brazing, so as to form the above-mentioned annular collar of the bushing.

In another characteristic of the invention, the annular collar extends radially from the outer cylindrical surface of the bushing at approximately equal distances between the two axial ends of the bushing. The bushing can then be symmetrical in shape about a midplane containing the annular collar, e.g. in order to avoid any possibility of the bushing being positioned the wrong way round on being assembled to the turbomachine.

The tubular elements enabling the bushing to be formed may themselves be made by machining, plastic deformation, hydroforming, stamping, or flow turning.

An advantage of the invention is to use the same bushings for making connections between the nozzle and an under-nozzle feed enclosure disposed radially inside the nozzle, and to establish connections between the nozzle and an over-nozzle feed enclosure disposed radially outside the nozzle.

By mounting the bushings slidably in the orifices of the nozzle and feed enclosure walls, it is possible to reduce the mechanical stresses to which the bushings are subjected due to their own thermal expansion and that of the surrounding elements, when the turbomachine is in operation.

The connection device of the invention is simple to manufacture and makes it possible to avoid forming specific and additional means at the axial ends of a bushing that are dedicated to preventing the bushing moving in opposite axial directions. With this bushing that can easily be held by means of its middle collar, there is no longer any need firstly to form a surface for bearing against the intermediate plate that is used for sealing the feed enclosure, and secondly there is no need to machine an annular groove for retaining a retaining ring in the intermediate bushing, for the purpose of retaining the bushing axially.

The intermediate plate which until now has been necessary for providing axial support for the bushing can be replaced by an elastic sealing gasket of annular shape, mounted in the feed enclosure between an edge of the orifice receiving the bushing and a rear or downstream wall of the enclosure.

A considerable advantage associated with modifying or eliminating the intermediate plate is to reduce head losses in the gas feeding the injectors by no longer partially obstructing the outlets of the bushings into the injector feed enclosure.

BRIEF DESCRIPTION OF THE DRAWINGS

The invention will be better understood and other characteristics, details, and advantages thereof will appear more clearly on reading the following description, given by way of example with reference to the accompanying drawings, in which.

MORE DETAILED DESCRIPTION

Figure 1:
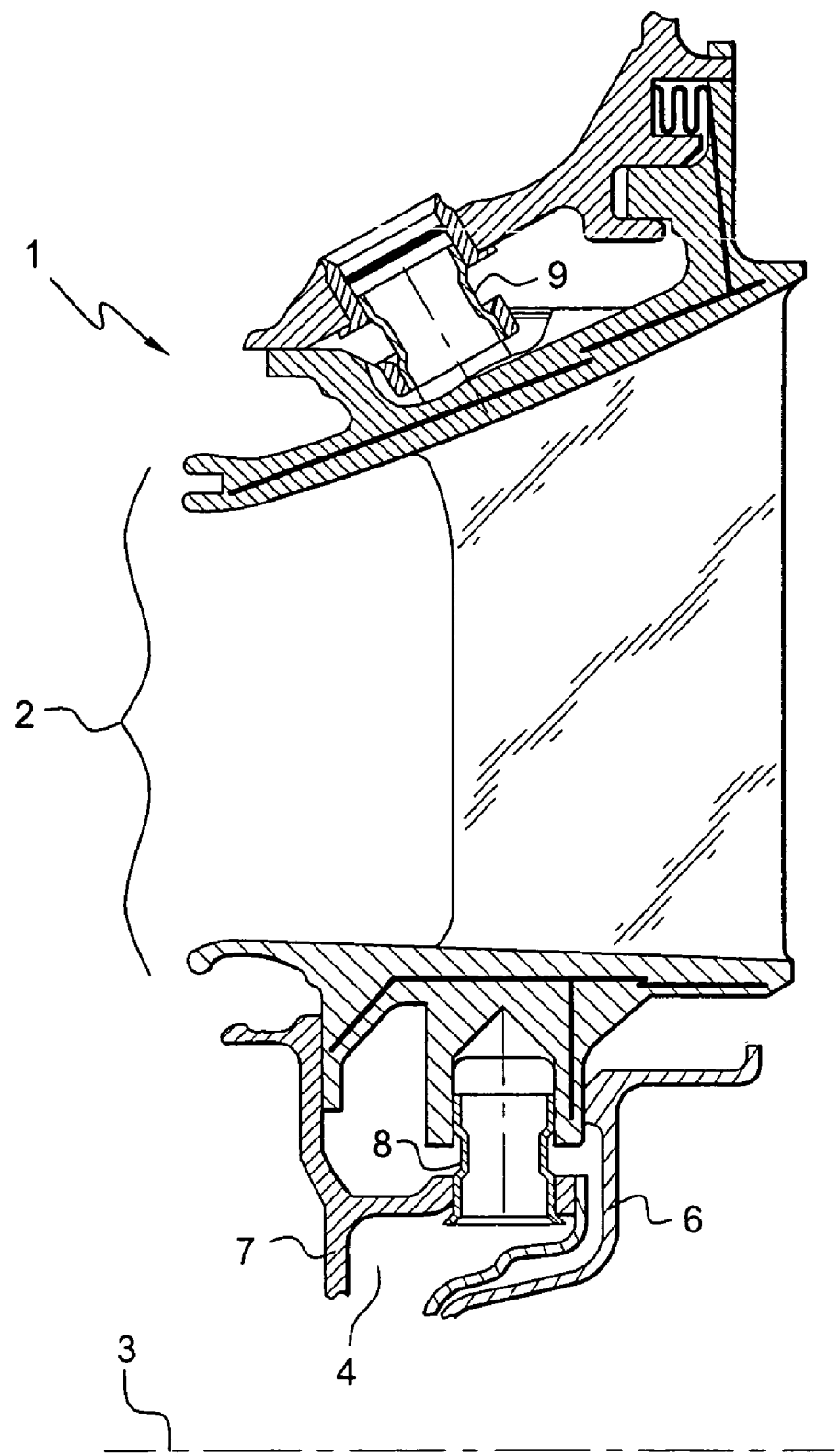
FIG. 1 is a diagrammatic longitudinal section view of prior art inner and outer connection devices in a turbomachine which is shown in part only.

FIG. 1 shows the prior art and is a fragmentary view of a turbine stage in a turbojet, showing in particular a nozzle sector and two feed enclosures for cooling fluid injectors. The nozzle 2 as a whole forms an annular passage in the turbojet 1 about the axis of rotation 3 of the rotor of the turbojet 1. A first enclosure 4 for feeding injectors (not shown) is situated radially inside the nozzle 2 and is referred to below as the under-nozzle feed enclosure 4, and a second enclosure 5 for feeding injectors (not shown) is disposed around and radially outside the nozzle 2 and is referred to below as the over-nozzle feed enclosure 5. The under-nozzle enclosure 4 has two walls 6 and 7 formed by a rear or downstream plate 6 which is positioned downstream relative to the flow direction of gas through the nozzle 2, and by a front or upstream plate 7 which is positioned upstream relative to the flow direction of gas through the nozzle 2.

The feed enclosures 4 and 5 are connected to the nozzle 2 by tubular connection devices 8, 9. The flow of gas through the nozzle 2 penetrates via the connection devices 8 and 9 into the injector feed enclosures 4 and 5.

Figure 2:
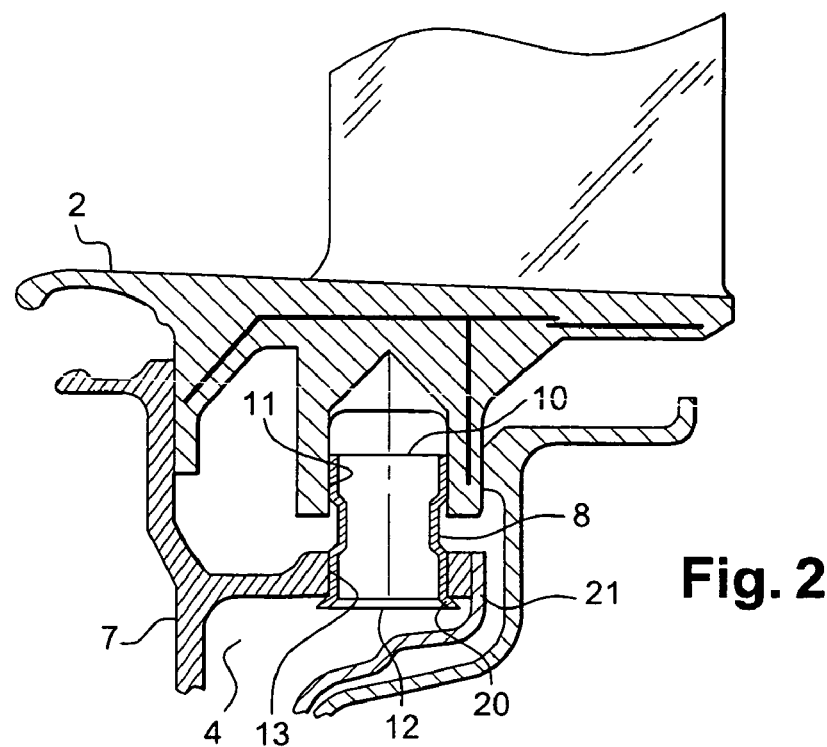
FIG. 2 is a view on a larger scale of a portion of FIG. 1.

The connection device, more clearly visible in FIG. 2, connecting the nozzle 2 to the under-nozzle feed enclosure 4 is formed by a bushing 8 that is slidably mounted at one of its open axial ends 10 in an orifice 11 in a wall of the nozzle 2, and is slidably mounted via its other open axial end 12 in an orifice 13 of an annular rim on the upstream plate 7 of the under-nozzle feed enclosure 4.

Figure 3:
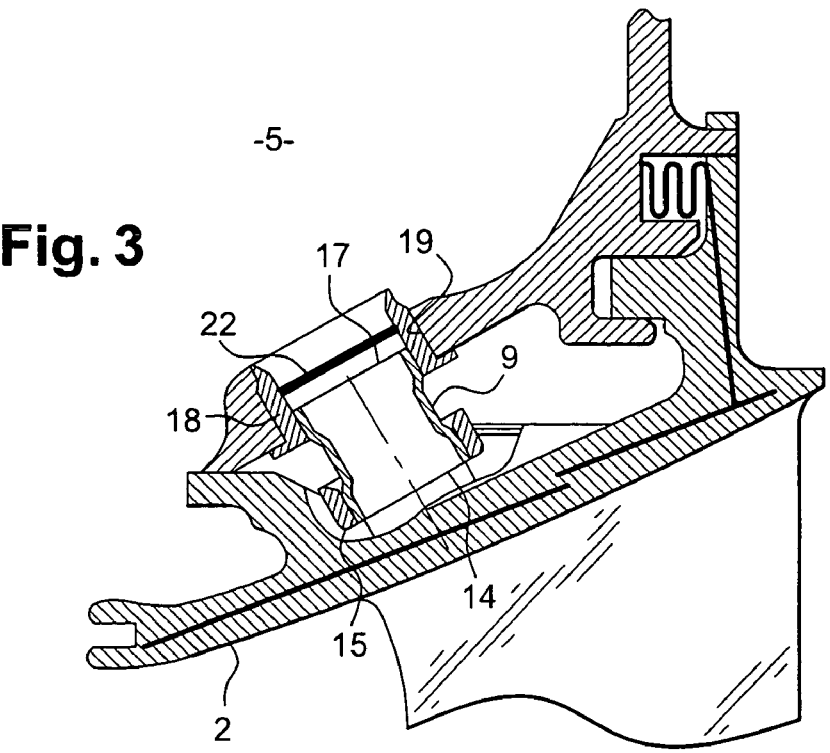
FIG. 3 is a view on a larger scale on another portion of FIG. 1.

The connection device that is more clearly visible in FIG. 3 for connecting the nozzle 2 to the over-nozzle feed enclosure 5 is formed by a bushing 9 slidably mounted via one of its open axial ends 14 in a first intermediate bushing 15 fixed in an orifice formed in a wall of the nozzle 2, and via its other open axial end 17 in a second intermediate bushing 18 fixed in an orifice 19 formed in a wall of the over-nozzle feed enclosure 5.

The connection bushings 8 and 9 have different axial retaining means and are therefore of different shapes. The axial retaining means of the bushing 8 is constituted in the prior art by a flare 20 formed at the end 12 of the bushing which can come to bear against an intermediate plate 21 mounted in the under-nozzle feed enclosure 4. The intermediate plate 21 is mounted in leaktight manner against the rim of the upstream plate 7 which carries the bushing 8. The means for retaining the bushing 9 axially in the prior art is constituted by a retaining ring 22 mounted in an annular groove in the intermediate bushing 18, the bushing 9 having no flare at one of its ends.

Figure 4:
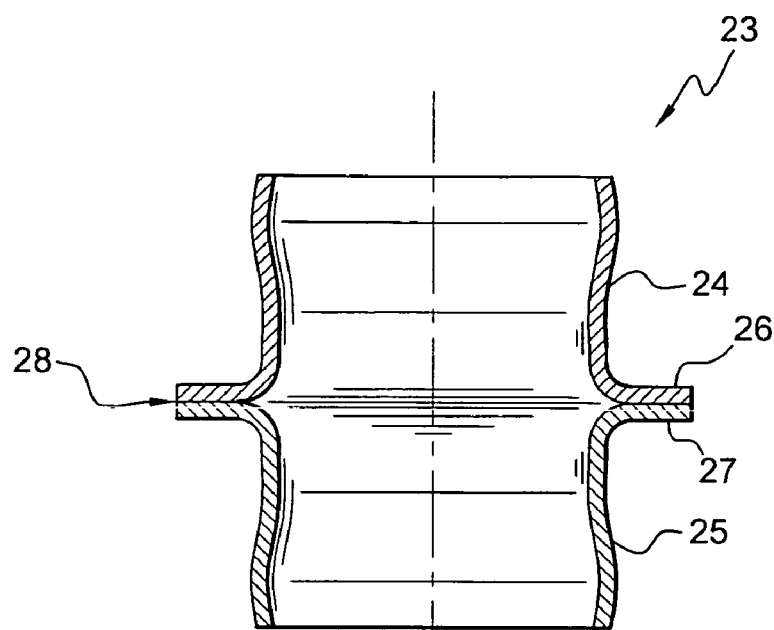
FIG. 4 is a diagrammatic longitudinal section view of a first embodiment of a connection device of the invention.

Reference is now made to FIG. 4 which shows a first embodiment of a connection device of the invention, comprising a bushing 23 made up of two identical tubular elements 24 and 25 which can be obtained by hydroforming, flow turning, or stamping, each having an annular rim 26, 27 at one axial end. To form the bushing 23, the two tubular elements 24 and 25 are brought together end to end with their annular rims 26 and 27 pressing against each other and being united by brazing so as to form an annular collar 28 on the bushing 23.

Figure 5:
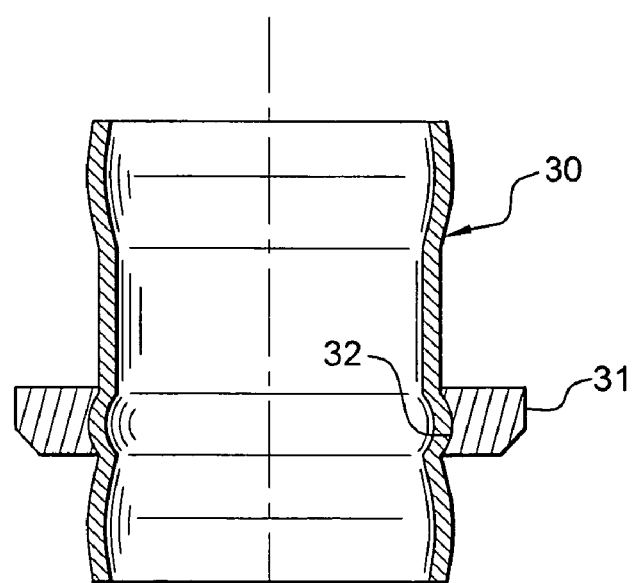
FIG. 5 is a diagrammatic longitudinal section view of a second embodiment of a connection device of the invention.

FIG. 5 shows a second embodiment of a connection device of the invention in which a cylindrical bushing 30 is mechanically deformed and is fixed to an annular washer 31 surrounding the bushing 30. By deforming the bushing 30 in the vicinity of the washer 31, by hydroforming or by mechanical deformation, it is possible to engage the material of the bushing 30 in an annular groove 32 formed in the cylindrical inside surface of the washer 31.

Figure 6:
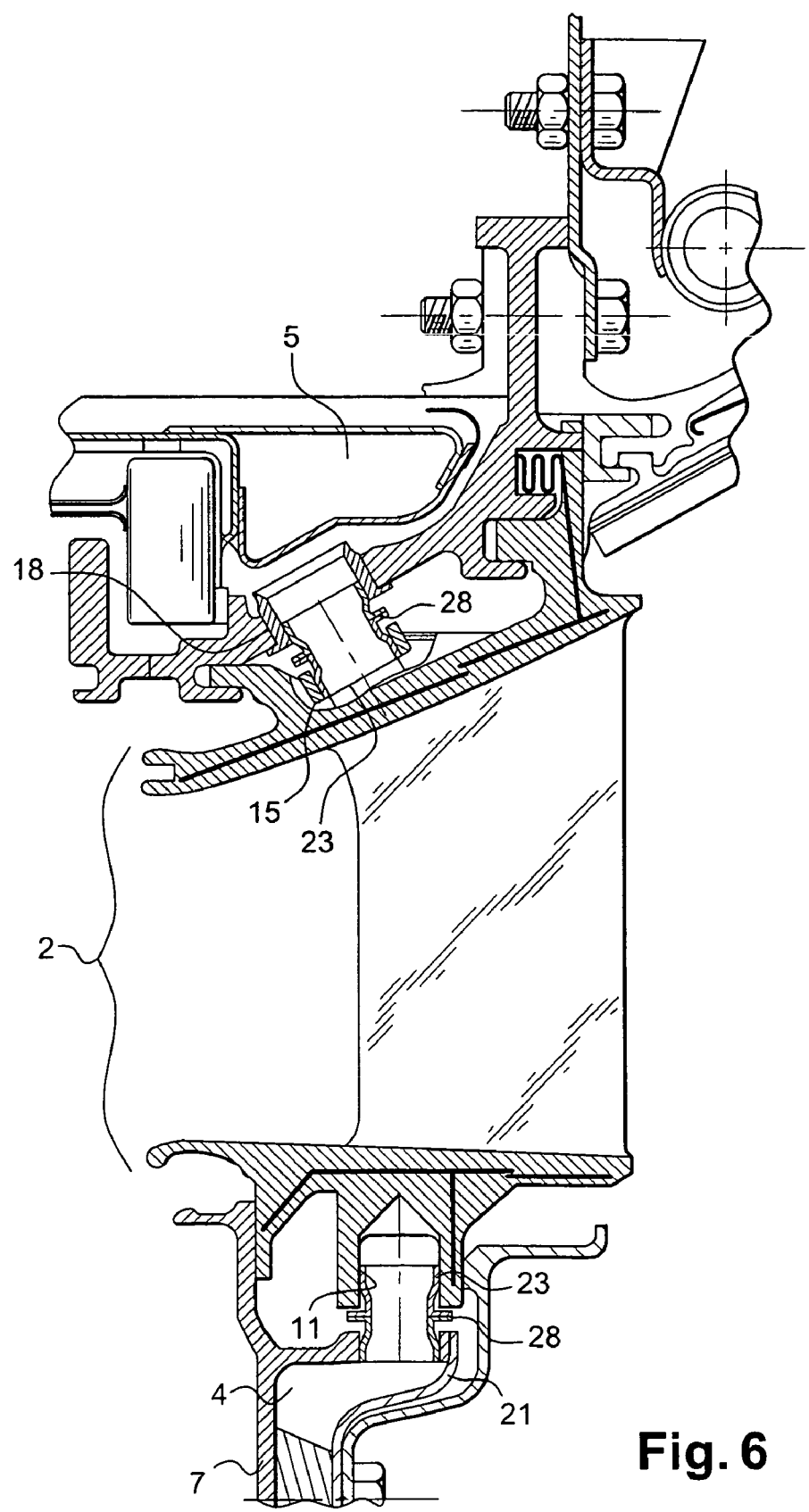
FIG. 6 is a view corresponding to FIG. 1, but using inner and outer connection devices of the invention.

FIG. 6 is a fragmentary view of a stage of a turbine in a turbojet that includes connection devices of the invention, and this figure shows in particular a sector of a nozzle and two cooling fluid injector feed enclosures. The prior art connection devices 8 and 9, shown in FIGS. 1, 2, and 3, have been replaced by connection devices of the invention, with the outer cylindrical surface of each bushing 23 or 30 having an annular collar 28 or 31 between the axial ends of the bushing, which collar extends radially outwards from the outer surface of the bushing.

The outer bushing 23 or 30 is positioned between the over-nozzle feed enclosure 5 and the nozzle 2 in such a manner that the collar 28 or 31 is disposed between the first intermediate bushing 15 and the second intermediate bushing 18 as described above, and can come into abutment against one and/or the other of these two intermediate bushings 15, 18, thereby preventing the bushing 23 or 30 from escaping from the orifices in which it is engaged, the radial size of the abutment means formed by the collar 28, 31 being greater than the radial dimensions of the orifices in which the bushing is engaged.

The inner bushing 23 or 30 is positioned between the under-nozzle feed enclosure 4 and the nozzle 2 in such a manner that the collar 28 or 31 is disposed between the orifice 11 formed in the wall of the nozzle 2 and the annular rim of the upstream plate 7 of the under-nozzle feed enclosure 4, and can come into abutment against the nozzle 2 and/or against the annular rim, thereby preventing the bushing from leaving the orifices in which it is slidably mounted.

Axially retaining the internal bushing 23 or 30 by means of the annular collar 28 or 31 enables the intermediate plate 21 to be moved away from the opening of the bushing 23 or 30 into the enclosure 4, and thus makes it possible to reduce head losses at the outlet from the bushing 23 or 30.

Figure 7:
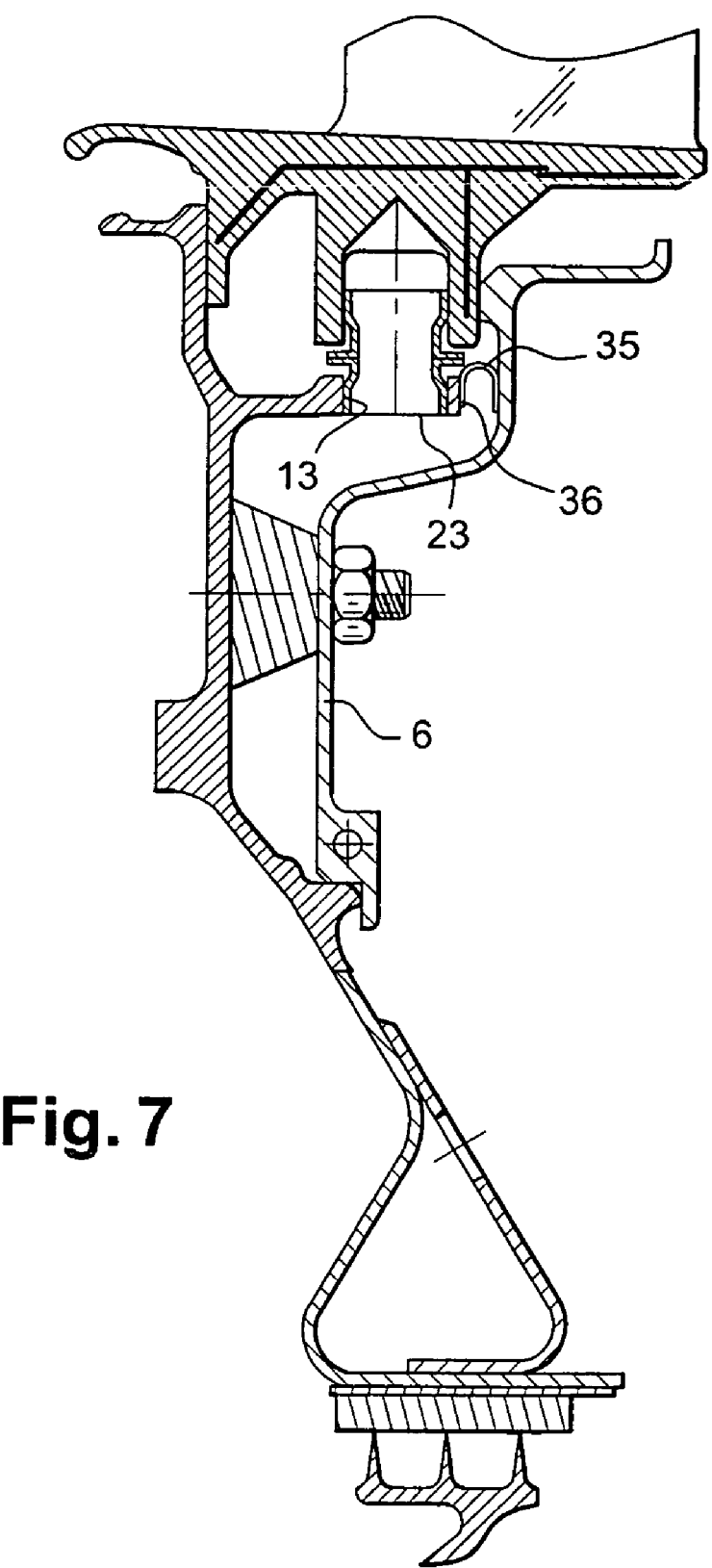
FIG. 7 is a view on a larger scale showing a portion of FIG. 6 including the inner connection device of the invention.

As shown in FIG. 7, it is also possible to replace the intermediate plate 21 by an elastic sealing gasket 35 of annular shape, mounted inside the under-nozzle feed enclosure 4 between the edge 36 of the orifice 13 receiving the bushing 23 or 30 and the rear or downstream plate 6. This simple, lightweight, and inexpensive gasket 35 makes it possible to obtain a large empty volume around the outlet of the bushing 23 or 30 and to provide good sealing for the enclosure 4.

What is claimed is:

1. A connection device between a nozzle and a feed enclosure for feeding at least one cooling fluid injector in a turbomachine, the device comprising at least one bushing slidably mounted via its open axial ends in orifices in a wall of the nozzle and in a wall of the feed enclosure, and also retaining means for retaining the bushing axially, said retaining means comprising an outer annular collar projecting from a cylindrical outer surface of the bushing between the axial ends of the bushing and at a distance from said ends, wherein the bushing is made up of two tubular elements each having an annular rim at one end, the two annular rims being pressed one against the other and being united to form said outer annular collar of the bushing.

2. A connection device according to claim 1, wherein the outer annular collar is of radial size that is greater than a radial size of the orifices in which the ends of the bushing are engaged.

3. A connection device according to claim 1, wherein the bushing is obtained by mechanical deformation or machining.

4. A connection device according to claim 1, wherein the bushing establishes communication between the nozzle and a feed enclosure disposed radially inside the nozzle.

5. A connection device according to claim 4, wherein the bushing establishes communication between the nozzle and a feed enclosure disposed radially outside the nozzle, and wherein the bushings disposed radially outside and radially inside the nozzle are identical.

6. A connection device according to claim 4, wherein an elastic sealing gasket of annular shape is mounted in the feed enclosure between the edge of the orifice feeding the bushing and a rear or downstream plate.

7. A connection device according to claim 1, wherein the bushing establishes communication between the nozzle and a feed enclosure disposed radially outside the nozzle.

8. A connection device according to claim 7, wherein the bushing is engaged in an intermediate bushing fixed in an orifice formed in a wall of the feed enclosure, said intermediate bushing being shaped in such a manner as to be capable of being put into place and/or removed after the bushing has been put into place.

9. A connection device according to claim 1, wherein the end of each bushing opening out into the feed enclosure is far enough away from the wall of the enclosure to avoid increasing head losses in the fluid passing via the bushing.

10. A connection device between a nozzle and a feed enclosure for feeding at least one cooling fluid injector in a turbomachine, the device comprising at least one bushing slidably mounted via its open axial ends in orifices in a wall of the nozzle and in a wall of the feed enclosure, and also retaining means for retaining the bushing axially, said retaining means comprising an outer annular collar projecting from a cylindrical outer surface of the bushing between the axial ends of the bushing and at a distance from said ends,
    wherein the bushing comprises a tubular element having an annular washer fitted thereon and secured thereto to form said outer annular collar, the bushing being mechanically deformed to engage material from the bushing in an annular groove formed in a cylindrical inside surface of the washer.

11. A connection device according to claim 10, wherein the outer annular collar is of a radial size that is greater than a radial size of the orifices in which the ends of the bushing are engaged.

12. A connection device according to claim 10, wherein the bushing is obtained by mechanical deformation or machining.

13. A connection device according to claim 10, wherein the bushing establishes communication between the nozzle and a feed enclosure disposed radially inside the nozzle.

14. A connection device according to claim 13, wherein the bushing establishes communication between the nozzle and a feed enclosure disposed radially outside the nozzle, and wherein the bushings disposed radially outside and radially inside the nozzle are identical.

15. A connection device according to claim 13, wherein an elastic sealing gasket of annular shape is mounted in the feed enclosure between the edge of the orifice feeding the bushing and a rear or downstream plate.

16. A connection device according to claim 10, wherein the bushing establishes communication between the nozzle and a feed enclosure disposed radially outside the nozzle.

17. A connection device according to claim 16, wherein the bushing is engaged in an intermediate bushing fixed in an orifice formed in a wall of the feed enclosure, said intermediate bushing being shaped in such a manner as to be capable of being put into place and/or removed after the bushing has been put into place.

18. A connection device according to claim 10, wherein the end of each bushing opening out into the feed enclosure is far enough away from the wall of the enclosure to avoid increasing head losses in the fluid passing via the bushing.

19. A connection device according to claim 10, wherein, in an axial direction, a gap is present between the annular collar and an adjacent surface such that the bushing is permitted to slide in the axial direction by a limited amount with respect to the nozzle and feed enclosure.

20. A connection device according to claim 10, wherein the annular washer includes a chamfer on one side.

\* \* \* \* \*